March 10, 1925.

G. J. HAGAN

BAR AND SHEET HEATING FURNACE

Filed April 17, 1923   3 Sheets-Sheet 1

1,529,617

INVENTOR
George J. Hagan
by Darwin S. Wolcott
ATTORNEY

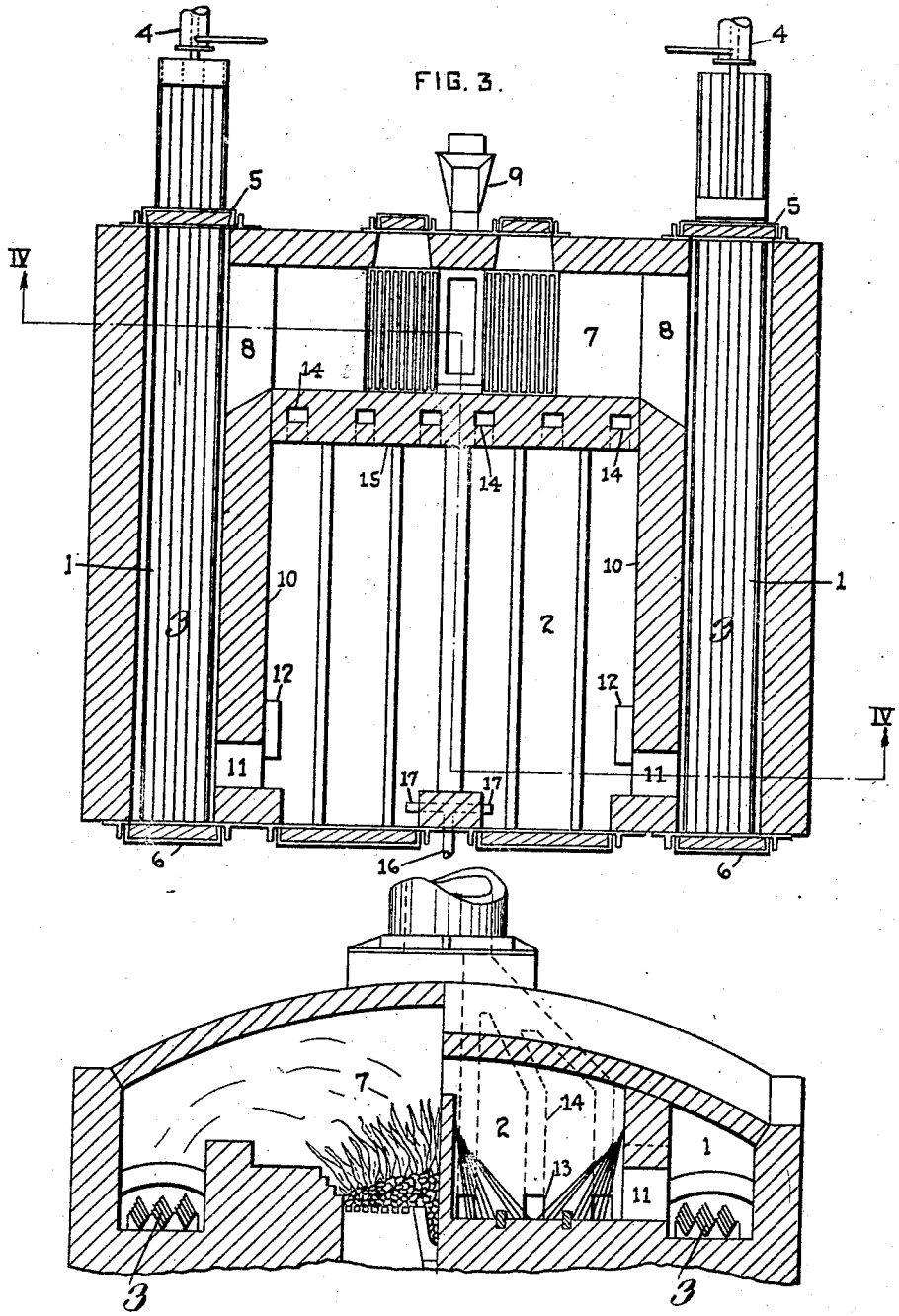

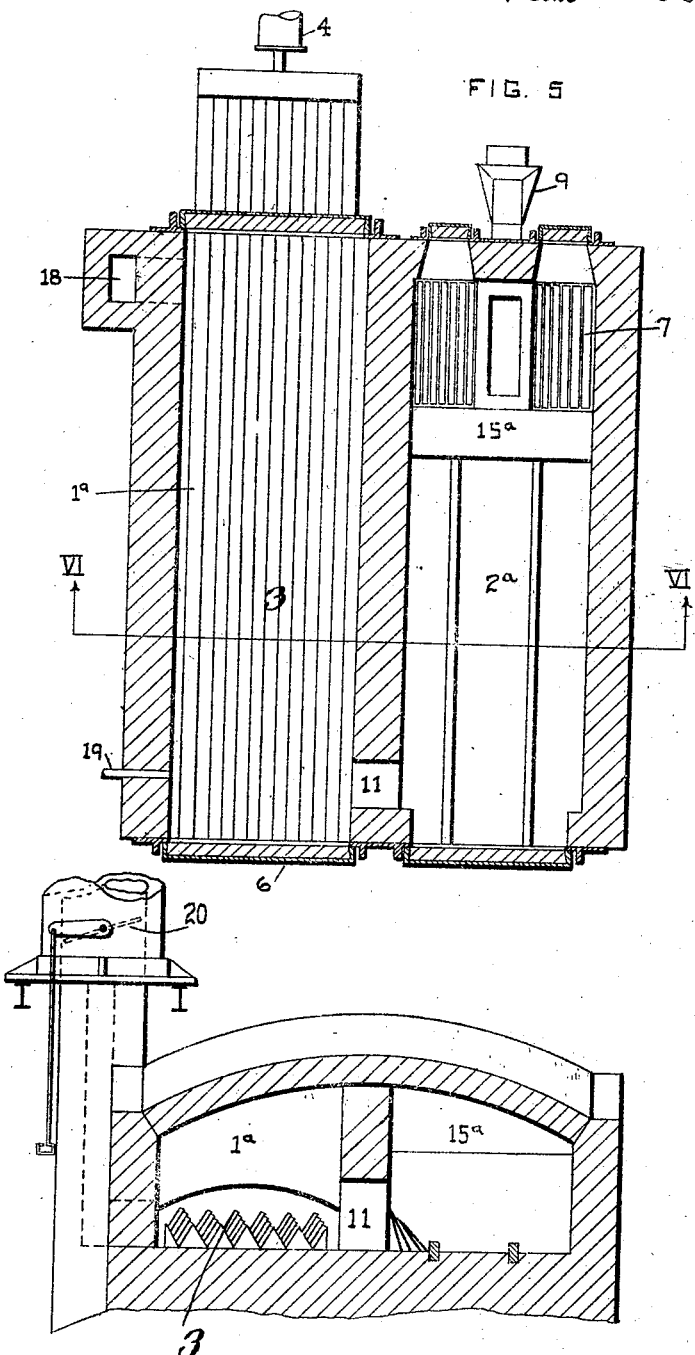

Patented Mar. 10, 1925.

1,529,617

UNITED STATES PATENT OFFICE.

GEORGE J. HAGAN, OF PERRYSVILLE, PENNSYLVANIA, ASSIGNOR TO GEORGE J. HAGAN COMPANY, OF PITTSBURGH, PENNSYLVANIA, A CORPORATION OF PENNSYLVANIA.

BAR AND SHEET HEATING FURNACE.

Application filed April 17, 1923. Serial No. 632,752.

*To all whom it may concern:*

Be it known that I, GEORGE J. HAGAN, residing at Perrysville, in the county of Allegheny and State of Pennsylvania, a citizen of the United States, have invented or discovered certain new and useful Improvements in Bar and Sheet Heating Furnaces, of which improvements the following is a specification.

In the manufacture of metal sheets the steel or iron is reduced to what is known as sheet bars which are heated and reduced in pairs. After a pair of bars has been reduced to a certain thickness, a second and sometimes a third pair of bars is similarly reduced and the resulting partially formed sheets are arranged in a pack and raised to a rolling temperature. If light gauges are desired, the sheets are doubled before being arranged in packs. Furnaces have been built having separate chambers for heating the bars and partially reduced sheets, said furnace being so constructed that the chambers are heated in sequence from a common combustion chamber. The chambers are so constructed and arranged that there is not sufficient travel of the products of combustion in contact with the charge therein to efficiently heat the same, and hence it has been necessary in the use of such furnaces to maintain a temperature in the first chamber much higher than is desired or required to heat the charge therein to the proper temperature. The object of the invention described herein is to provide a furnace having a plurality of heating chambers, so constructed and connected that two or more chambers will be heated in sequence and also providing for such a long traverse of the products of combustion in the respective chambers as to ensure the utilization of a large percentage of the B. t. u.'s generated in the combustion of the fuel. The invention is hereinafter more fully described and claimed.

In the accompanying drawings forming part of this specification, Figure 1 is a sectional plan view of a furnace embodying the improvements claimed herein;

Figure 3 is a sectional plan view similar to Figure 1, but illustrating a modification of the construction of the furnace;

Figure 4 is a sectional elevation on a plane indicated by the line IV—IV, Figure 3; and Figures 5 and 6 are views similar to Figures 1 and 2 illustrating a modification of the improvement claimed herein.

Figures 1, 2:
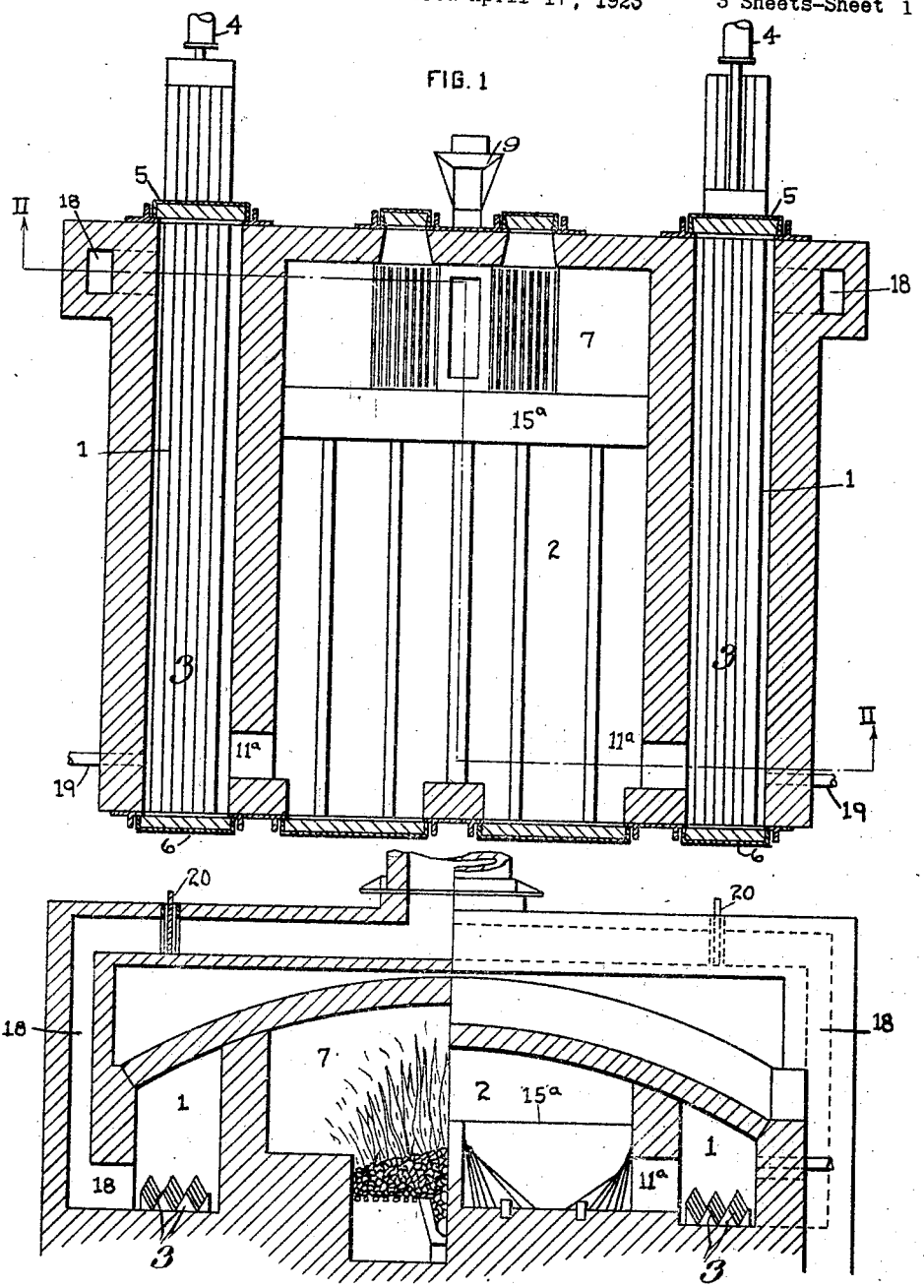
Figure 2 is a sectional elevation on a plane indicated by the line II—II, Figure 1.

It is characteristic of the furnace claimed herein that the portion employed for heating the bars is preferably formed by or consists of two sections or chambers 1 arranged respectively on opposite sides of the sheet heating portion or chamber 2, as shown in Figures 1 to 4. Or if desired the bar heating portion may consist of one section or chamber 1ª extending along one side of the sheet heating chamber 2ª as shown in Figures 5 and 6. While any construction of hearth 3 may be employed for supporting the bars to be heated, it is preferred to use a construction known in the art as the Allis hearth, shown and described in the sundry Letters Patent to Thomas V. Allis. The bar or pair heating chambers are so constructed that the bars may be fed into one end of the furnace by a suitable pushing mechanism 4 and discharged from the opposite end, the openings at the charging end being normally closed by doors 5, and the discharge openings which are preferably in the front wall of the chambers are normally closed by doors 6. As the sheet bars are comparatively thick and are arranged in piles while being passed through the furnace, considerable time is required for the heating of the same, whereas the partially reduced sheets have large surface areas and can therefore be quickly heated, the sheet heating chambers being formed substantially shorter than the pair heating chambers. In the construction shown in Figure 1, a combustion chamber 7 is arranged in the rear of the sheet heating chamber and intermediate the rear portions of the bar heating chambers and products of combustion may either flow over a bridge wall into the sheet heating chamber or through ports or openings 8 into the rear ends of the pair heating chambers as shown in Fig. 3. While in the construction shown, provision is made for the combustion of coal fed into the combustion chambers by a stoking mechanism 9, it will be understood that other forms of fuel known in the art, both gaseous and liquid, may be employed in heating the furnace.

In the construction shown in Figures 3 and 4 the products of combustion pass laterally through ports 8 in the side walls 10 common to the bar and sheet heating chambers, and also forming the end walls of the combustion chamber 7, and flowing along the bar pair heating chambers towards the discharge end thereof and pass through ports 11 communicating with the front or charging end of the sheet heating chamber 2. The flow of products of combustion through these ports 11 into the sheet heating chamber is controlled by dampers 12 which in the construction shown consists of tiles movable transversely of the ports 11. The products of combustion in the sheet heating chamber flow to the rear thereof and escape through ports 13 into flues 14 leading to the stack, said flues being formed in a wall 15 intermediate the sheet heating chamber and the combustion chamber 7. As in some cases the gases, etc., escaping from the bar or pair heating chambers 1 into the sheet heating chambers may not have sufficient thermal units to properly heat the sheets in the chamber 2, provision is made for the introduction of an auxiliary heating means which in the construction shown, consists of a pipe 16 for supplying liquid or gaseous fuel and burners 17 projecting into the front end of the sheet heating chamber.

In the construction shown in Figures 1 and 2, the wall 15ª intermediate the combustion chamber 7 and the sheet heating chamber 2 does not extend to the top of the heating chamber but is made in the form of a bridge wall 15ª so that products of combustion will flow direct from the combustion chamber into and along the chamber 2 out through ports 11ª in the side walls of the sheet heating chamber into the front end of the bar or pair heating chambers 1, along these chambers into flues or passages 18 connected as shown in Figure 2 to the stack. The flow of products of combustion through the several chambers to stack is controlled by dampers 20 arranged in the flues 18. In this construction a relatively small percentage of the thermal units will be taken up in the sheet heating chamber and by reason of the long travel of the products of combustion, etc., through the bar heating chambers, the latter will be raised to the desired temperature. While the products of combustion will, in passing through the sheet heating chamber be reduced in temperature, the heat thereof will be above the temperature to which the bars must be raised for rolling, provided the bars are more or less heated when they reach the point where the products of combustion enter the chambers 1. In order to ensure this preheating, the chambers 1 should be made of considerable length or substantially longer than would be necessary in the form or construction shown in Figure 3. In case it is found necessary, auxiliary heating means in the form of a burner 19 for the combustion of liquid or gaseous fuel may be connected to the bar heating chamber 1 adjacent to the discharge ends.

As shown in Figures 5 and 6 the furnace may be constructed with only one pair-heating portion or chamber 1ª in which case such portion or chamber is preferably made of such width as to have a heating capacity substantially equal to united capacities of the two chambers in the constructions shown in Figures 1 to 4.

It is characteristic of the improved furnace that the products of combustion flow in substantially parallel lines but in opposite directions in the respective chambers.

I claim herein as my invention:

1. A furnace having in combination independent sheet and pair heating portions extending side by side, a combustion chamber connected to one of said heating portions, a stack connected to the other heating portion, said portions being so connected that products of combustion will traverse substantially the entire lengths of said chambers.

2. A furnace having in combination a sheet heating portion, a pair heating portion consisting of sections arranged on opposite sides of the sheet heating portion, a combustion chamber adapted to be connected to one of the heating portions, a stack connected to the other portion, and means for connecting said portions at points remote from their points of connection with the combustion chamber and the stack.

3. A furnace having in combination a sheet heating portion, a pair heating portion consisting of sections arranged on opposite sides of the sheet heating portion, a combustion chamber connected to the sheet heating portion, a stack connected to the rear end of the pair heating portion, and ports or openings connecting the front end of the pair heating portion with the front end of the sheet heating chamber.

4. A furnace having in combination a sheet heating portion, a pair heating chamber consisting of sections arranged on opposite sides of the sheet heating portion and extending beyond the rear end of the sheet heating portion, a combustion chamber arranged in the rear of the sheet heating portion and intermediate the pair heating portion and connected to one of said portions, a stack connected to the other portion, said portions being connected at points remote from their points of connection with the combustion chamber and stack.

5. A furnace having in combination a sheet heating portion, a pair heating portion extending alongside of and parallel with the sheet heating portion, a combustion chamber arranged in the rear of the sheet heating portion and connected with the sheet heating portion adjacent to its rear end, a stack connected to the rear end of the pair heating portion, said portions being connected adjacent to their front ends.

In testimony whereof, I have hereunto set my hand.

GEORGE J. HAGAN.